United States Patent
Sun et al.

(10) Patent No.: US 9,332,474 B2
(45) Date of Patent: May 3, 2016

(54) SIGNALING SUPPORT FOR MULTI SECTOR DEPLOYMENT IN CELLULAR COMMUNICATIONS

(75) Inventors: Ying Sun, Sundbyberg (SE); Tao Cui, Upplands Väsby (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 325 days.

(21) Appl. No.: 13/545,941

(22) Filed: Jul. 10, 2012

(65) Prior Publication Data
US 2013/0308473 A1 Nov. 21, 2013

Related U.S. Application Data

(60) Provisional application No. 61/648,485, filed on May 17, 2012.

(51) Int. Cl.
*H04W 4/00* (2009.01)
*H04W 36/30* (2009.01)
*H04W 92/20* (2009.01)
*H04W 36/02* (2009.01)

(52) U.S. Cl.
CPC ............ *H04W 36/30* (2013.01); *H04W 36/023* (2013.01); *H04W 92/20* (2013.01)

(58) Field of Classification Search
USPC .......... 370/241, 252, 254, 255, 328, 331–333
See application file for complete search history.

(56) References Cited

U.S. PATENT DOCUMENTS

| 6,615,044 B2 | 9/2003 | Tigerstedt et al. |
|---|---|---|
| 8,140,081 B2 | 3/2012 | Barett et al. |
| 8,600,392 B1 * | 12/2013 | Oroskar et al. ............... 455/446 |
| 2007/0149206 A1 | 6/2007 | Wang et al. |
| 2007/0258406 A1 | 11/2007 | Kaitz et al. |
| 2009/0028112 A1 | 1/2009 | Attar et al. |
| 2009/0098874 A1 | 4/2009 | Goransson et al. |
| 2009/0219893 A1 | 9/2009 | Korpela et al. |
| 2010/0034173 A1 | 2/2010 | Luo et al. |
| 2010/0296488 A1 | 11/2010 | Kuo |

(Continued)

FOREIGN PATENT DOCUMENTS

| EP | 1740007 A1 | 1/2007 |
|---|---|---|
| EP | 2222119 | 8/2010 |

(Continued)

OTHER PUBLICATIONS

International Search Report and Written Opinion, Application No. PCT/IB2013/000777, dated Dec. 4, 2013, 13 pages.

(Continued)

*Primary Examiner* — Yemane Mesfin
*Assistant Examiner* — Mon Cheri Davenport
(74) *Attorney, Agent, or Firm* — Patents on Demand, P.A.; Brian K. Buchheit; Scott M. Garrett

(57) ABSTRACT

A method in a controller for a first cell in a mobile cellular network for making a decision to handover a user equipment to a second cell of the mobile cellular network is described. The method may include obtaining a first measurement of an uplink signal from a user equipment at the first cell, obtaining a second measurement of an uplink signal from the user equipment at the second cell, and making a decision to handover the user equipment from the first cell to the second cell using the obtained first and second measurements.

19 Claims, 9 Drawing Sheets

(56) References Cited

U.S. PATENT DOCUMENTS

| | | |
|---|---|---|
| 2010/0311322 A1 | 12/2010 | Bao et al. |
| 2011/0009116 A1 | 1/2011 | Moberg et al. |
| 2011/0105112 A1 | 5/2011 | Cave et al. |
| 2011/0149913 A1 | 6/2011 | Park et al. |
| 2011/0159926 A1 | 6/2011 | Whittaker |
| 2011/0306347 A1 | 12/2011 | Choi et al. |
| 2012/0028676 A1 | 2/2012 | He |
| 2012/0082058 A1* | 4/2012 | Gerstenberger et al. ...... 370/252 |

FOREIGN PATENT DOCUMENTS

| | | |
|---|---|---|
| EP | 2254381 | 11/2010 |
| EP | 2375809 | 10/2011 |
| EP | 2424302 | 2/2012 |
| EP | 2432279 A1 | 3/2012 |
| WO | WO 02/100125 | 12/2002 |
| WO | WO 03/094395 | 11/2003 |
| WO | WO 2007/075559 | 7/2007 |
| WO | WO 2008/094333 | 8/2008 |
| WO | WO 2009/116908 | 9/2009 |
| WO | WO 2010/035074 | 4/2010 |
| WO | WO 2011/034634 | 3/2011 |
| WO | WO 2012/000430 | 1/2012 |

OTHER PUBLICATIONS

"3GPP TS 36.211 V10.4.0; Evolved Universal Terrestrial Radio Access (E-UTRA); Physical Channels and Modulation", *3rd Generation Partnership Project; Technical Specification Group Radio Access Network*, (Dec. 2011), 101 pages.

"3GPP TS 36.300 V11.1.0; Evolved Universal Terrestrial Radio Access (E-UTRA) and Evolved Universal Terrestrial Radio Access Network (E-UTRAN); Overall description; Stage 2", *3rd Generation Partnership Project; Technical Specification Group Radio Access Network*(Release 11), (Mar. 2012), 194 pages.

International Preliminary Report on Patentability (Chapter I), Application No. PCT/IB2013/000777, dated Nov. 18, 2014, 9 pages.

* cited by examiner

SIGNALING SUPPORT FOR MULTI SECTOR DEPLOYMENT IN CELLULAR COMMUNICATIONS

RELATED APPLICATIONS

This application claims the benefit of U.S. Provisional Application No. 61/648,485 filed May 17, 2012, which is hereby incorporated by reference.

FIELD

Embodiments of the invention relate to the field of signaling in cellular radio communications; and more specifically, to sharing measurements between base stations.

BACKGROUND

In a usual LTE (Long Term Evolution) deployment a number of eNodeBs (Evolved Node B or eNB) are deployed to provide coverage in a specific area. Each eNodeB can manage a set of cells and all UEs (User Equipment) that are in the coverage area of those cells.

From the UE perspective, the cells are distinguished by a physical-layer cell identity (PCI) which is defined in 3GPP TS 36.211 Ch 6.11. In a normal deployment scenario, neighboring cells have different PCIs and when UEs are in a connected state (i.e. not idle) they use these PCIs as an identifier for handover measurement.

Cell Merge, also called shared cell or multi-sector cell in some cases, is a new cell configuration for LTE and enables a multi Radio Resource Unit (RRU) deployment that is not dependent on cell planning from a Radio Frequency (RF) perspective. It is achieved by allowing different RRUs to use the same PCI. As a result, all RRUs are considered by the UE to be part of the same cell. The spatially separated RRU or a group of RRUs are called a sector. A cell can contain multiple sectors, and a UE can belong to one sector or multiple sectors depending on the degree of sector isolation.

In the basic LTE cell configuration, all of the UE's (User Equipment) camped in that cell shall share cell resources by time and/or frequency multiplexing. In a multi-sector cell, yet another resource domain, a spatial resource is introduced. UEs share cell resources also by SDM (Space-Division Multiplexing).

FIG. 1 shows UE signal detection by different cell sectors in accordance with SDM. A single UE, UE1 can be within radio contact with three different sectors S1, S2, S3 of a single cell. A first radio signal path P1 connects to a macro sector S1 antenna array A1. A second path P2 connects to a pico sector S2 within the macro sector and a third path P3 connects to a second pico sector S3. The first UE UE1 is located between the two pico sectors and within the macro sector of a single cell. A second UE, UE2, farther away from the pico sectors communicates with the macro sector but may still be able to interfere with one or both of the pico sectors even if it is beyond the range of the pico sector antennas. This is inter-sector interference (ISI).

Some UE's that are spatially separated can use the same time and frequency resource, but on different sectors. In some cases, antenna feeders and antenna placement cannot be altered or planned, leading to ISI, where a UE's transmission can be detected in several sectors. In uplink (UL), the received signals detected in the multiple antennas can be selected to combine in order to obtain macro diversity gain; in downlink (DL), the signal is only transmitted in the selected antennas to enable higher transmission energy.

There are several benefits for this configuration. A first benefit is easy cell planning. All sectors belong to the same cell, so there is no need to consider inter-cell interference. A second benefit is reduced L3 (Layer 3) control signaling, because there is no need to perform handover between sectors within one cell. A third benefit is that, for the UEs belonging to multiple sectors, macro diversity gain can be achieved in the uplink by selectively combining the signals from multiple sectors. In the downlink, eNodeB may selectively transmit in one or multiple sectors. The UE can combine the received signals from transmitted sectors. For the UE belonging to sectors which are spatially isolated, multiplexing different UEs in the same time and frequency resources can be used to improve capacity.

FIG. 2 shows the Handover procedure in LTE between eNodeBs without a MME (Mobility Management Entity)/serving GW (Gateway) change as defined in 3GPP TS 36.300. After the source eNodeB receives the measurement reports 2 from the UE, the source eNodeB decides to trigger the handover 3 by starting to prepare the target cells.

Focusing on the handover preparation phase, the source eNodeB issues a Handover Request message 4 to the target eNodeB(s) passing all necessary information to prepare the Handover on the target side. The RRC (Radio Resource Control) context included in the Handover Request message contains all the current UE configurations in the source cell. Admission Control 5 may be performed by the target eNodeB after receiving the Handover Request if the resources can be granted by the target eNodeB. Then the target eNodeB configures the required resources in the target cell and sends a Handover Request Acknowledge 6 to the source eNodeB. The Handover Request Acknowledge message includes a transparent container to be sent to the UE as an RRC message (i.e. RRC Connection Reconfiguration) 7 to perform the handover.

For improved efficiency and user experience, handover decisions and inter-cell interference management may be improved to accommodate multi-sector cell deployments.

SUMMARY

Embodiments of the present invention allow a high quality handover decision to be made when cells have multiple sectors. High quality inter-cell interference and other channel quality estimates can also be made. SRS configurations and SRS channel quality measurement results can be forwarded among eNodeBs over an X2 interface. The SRS channel quality can be widely used for many purposes, such as for better uplink mobility measurement to improve handover success rates. The SRS channel quality estimates also enable a soft mobility scheme in uplink by allowing sector selection among different eNodeBs. The SRS channel quality estimates also can be used for uplink geometry measurement to improve the performance of inter-cell interference management schemes. Better interference management schemes are possible with better granularity even at the sector level.

The SRS channel quality estimates are wideband and can be filtered per sector. This maintains the signaling load of the X2 interface. Since the SRS resource is semi-persistent and configured with RRC, fast backhaul support is not needed.

In one embodiment, the invention includes a method in a controller for a first cell in a mobile cellular network for making a decision to handover a mobile station to a second cell of the mobile cellular network. The method includes obtaining a first measurement of an uplink signal received from a user equipment at the first cell, obtaining a second measurement of an uplink signal received from the user equipment at the second cell, and making a decision to handover the user equipment from the first cell to the second cell using the obtained first and second measurements.

In another embodiment, the invention includes an apparatus, such as a base station that includes a receiver to receive an uplink signal from a user equipment at a first cell of a mobile cellular network, an interface to receive from a second cell in the mobile cellular network an indication of a second measurement of an uplink signal received from the user equipment at the second cell, and a processor at the first cell to make a first measurement of the uplink signal received at the first cell and to make a decision to handover the user equipment from the first cell to the second cell using the obtained first and second measurements.

In another embodiment, the invention includes a method in a serving Evolved Node B (eNB) of a first cell of a Long Term Evolution packet data communications network. The method includes configuring sounding resource signal (SRS) resources in a User Equipment (UE), sending the SRS configuration to a target eNodeB of a second cell, performing SRS reception with the UE to measure uplink channel quality, receiving SRS measurements made by the target eNodeB with respect to the UE at an X2 interface from the target eNodeB, computing uplink geometry using the performed and received SRS measurements, and comparing the computed uplink geometry with a threshold to determine whether the UE should be handed over to the target eNodeB.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
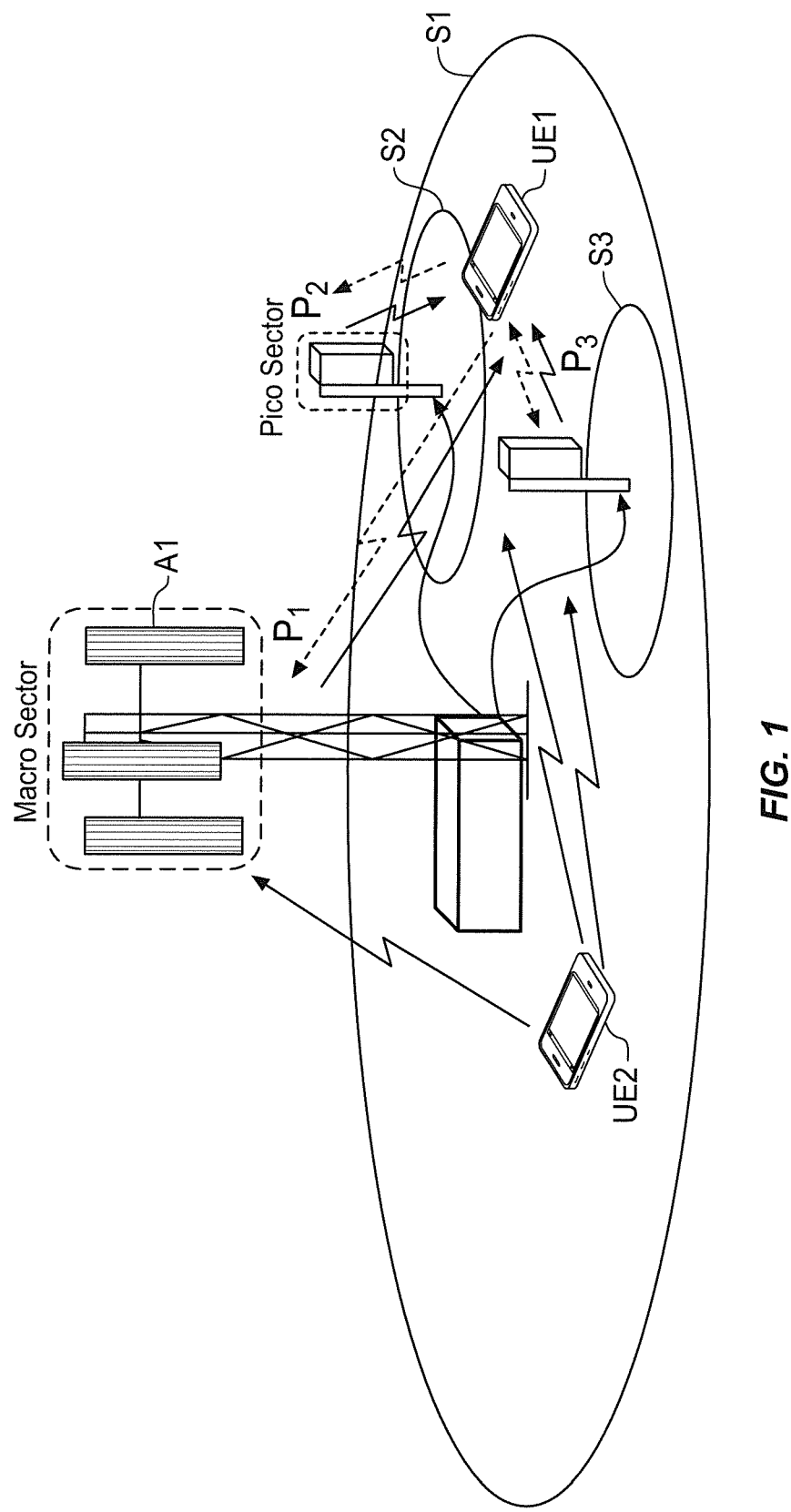
FIG. 1 is a diagram of a cell having three different sectors to communicate with a mobile station.

In the following description, numerous specific details such as logic implementations, opcodes, means to specify operands, resource partitioning/sharing/duplication implementations, types and interrelationships of system components, and logic partitioning/integration choices are set forth. It will be appreciated, however, by one skilled in the art that the different implementations may be practiced without such specific details. In other instances, control structures, gate level circuits and full software instruction sequences have not been shown in detail in order not to obscure the description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A user may communicate using user equipment (UE) via a communications system and send and receive data to other UEs in the system or outside the system. Access to the communications system may be provided by a fixed line or wireless communication interface, or a combination of these. Examples of wireless access systems providing mobility for UEs include cellular access networks, various wireless local area networks (WPANs), wireless personal area networks (WPANs), satellite based communication systems, and various combinations of these. A communication system typically operates in accordance with a standard and/or a set of specifications and protocols which set out what the various elements of the system are permitted to do and how that should be achieved. For example, it is typically defined if the user, or more precisely user device, is provided with a circuit switched or a packet switched communications, or both. Also, the manner in which communication should be implemented between the user device and the various elements of the communication and their functions and responsibilities are typically defined by a predefined communication protocol.

Various functions and features are typically arranged in a hierarchical or layered structure, so called protocol stack, wherein the higher level layers may influence the operation of the lower level functions. In cellular systems a network entity in the form of a base station provides a node for communication with mobile devices in one or more cells or sectors. In certain systems, a base station is called 'Node B'. Typically the operation of a base station apparatus and other apparatus of an access system required for the communication is controlled by a particular control entity, such as a base station controller, mobile switching center, or packet data support node.

The present disclosure is described in the context of the third generation (3G) mobile communications systems of the universal mobile telecommunications system (UMTS) and, in particular, long term evolution (LTE). A particular example of LTE is the Evolved Universal Terrestrial Radio Access (E-UTRA). An Evolved Universal Terrestrial Radio Access Network (E-UTRAN) includes E-UTRAN Node Bs (eNodeBs) which are configured to provide base station and control functionalities. However, the invention is not so limited.

In the following description and claims, the terms "UE" and "User Equipment" are used to refer to remote terminals, mobile devices or radios, subscriber equipment and any other type of mobile device that may connect to base stations in more than cell and experience a handover. The term "handover" also includes "handoff." The term "eNB" and "eNodeB" is used generally to refer to a base station, an access point, a fixed terminal and similar devices. The term cell is used generally to refer to the area of radio coverage of a base station, an access point, or a sector antenna. The description is presented in the context of LTE for illustration purposes, but the invention is not so limited.

The described embodiments support forwarding SRS (Sounding Reference Signal) configurations and SRS channel quality measurement results among eNodeBs over an interface or a backplane interface e.g. an X2 interface. This information may not otherwise be available if the serving and neighboring cells belong to different eNodeBs. The SRS channel quality information can be widely used for many purposes, such as a better uplink mobility measurement to improve a handover success rate. The information also enables a soft mobility scheme in the uplink by allowing a sector selection among different eNodeBs. Furthermore, the information also can be used for an uplink geometry measurement to improve the performance of inter-cell interference management schemes. Better interference management schemes are possible with better granularity even at the sector level.

The SRS channel quality may be wideband and filtered per sector. As a result, the signaling load of the X2 interface may be well maintained. The SRS is a configurable signal normally used to allow uplink scheduling. In the present invention, the SRS signal is also used to obtain uplink channel quality measurements. It is a wider band reference signal typically transmitted in the last SC-FDMA (Single Carrier-Frequency Division Multiple Access) symbol of a 1 ms subframe as an optional feature that can turned off in each cell, depending on the SRS configuration for a particular cell. Its wideband characteristics makes it a good signal for measuring the uplink. Since the SRS resource is semi-persistent, configured with RRC, fast backhaul support is not needed.

A novel scheme may also be used to calculate the uplink geometry which might be used for a handover procedure and for an uplink interference management scheme.

The traditional mobility measurement method for downlink uses RSRP (Reference Signal Received Power) and RSRQ (Reference Signal Received Quality) of CRS (Cell-Specific Reference Signals) from serving and neighboring cells. After the UE is successfully connected to the target cell, new sectors are selected based on the sector selection mechanism in the new cell. However, problems may arise because differently sized sectors and cells can have a path loss imbalance between uplink and downlink caused by the heterogeneous network deployment. In such a scenario, the downlink RSRP based geometry measurement may not represent the uplink situation.

A second problem is a possible degraded ICIC (Inter-Cell Interference Coordination) performance in the multi-sector cell heterogeneous deployment. In such a scheme, the downlink geometry is used as an indication of possible uplink inter-cell interference that a UE might generate relative to the useful signal strength in the serving cell. As in handover, the uplink geometry is lower than 1 indicating that the signal strength received in the neighboring eNodeB is smaller than the signal strength received in the serving cell. The traditional geometry measurement based on downlink CRS RSRP/RSRQ will overestimate the inter-cell interference to cell A. Improper geometry estimation may cause improper inter-cell interference prediction in the uplink, which will affect the overall performance of the interference management mechanism.

Figure 3:
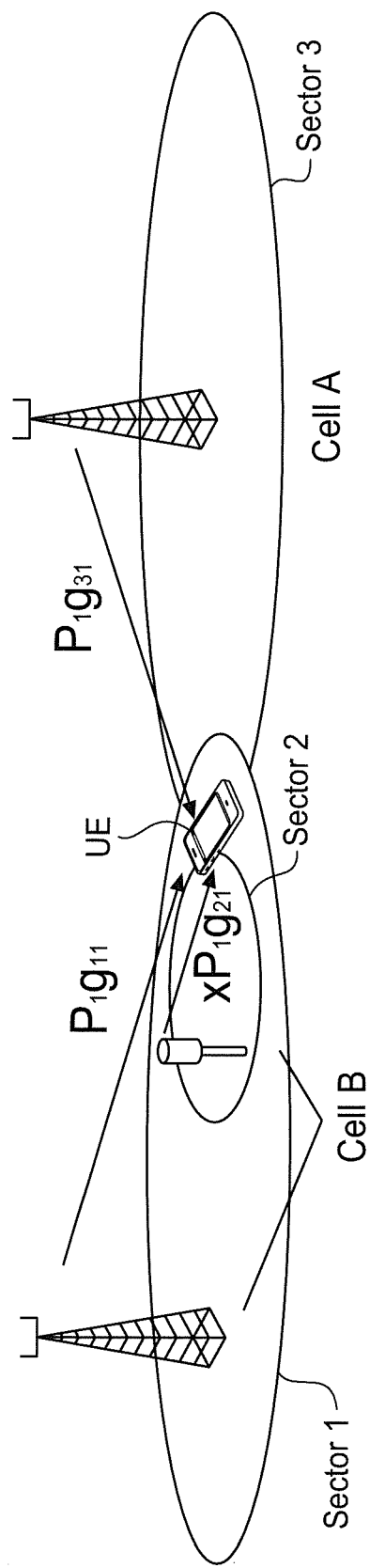
FIG. 3 is a diagram of computing uplink and downlink geometry in a cell with multiple sectors according to one embodiment of the invention.

An example is shown in FIG. 3 which shows a potential over-estimated geometry based on DL (DownLink) RSRP. Cell A is shown as having a single sector, sector 3, for simplicity. Cell B has multiple sectors: sector 1 is a macro sector and sector 2 is a pico sector. Many more sectors in a variety of different configurations may be present, depending on the particular implementation. Typically, a base station in a macro sector has a transmit power of 20 W and a base station in a pico sector has a transmit power of 1 W. The transmit power ratio, X, between macro and pico sectors is $X=P_1/P_2=1/20=0.05$.

The DL geometry is defined as the downlink power received by the UE at one cell compared to another cell. As shown in FIG. 3, the DL geometry=$RSRP_A/RSRP_B=P_1g_{31}/(P_1g_{11}+xP_1g_{21})=g_{31}/(g_{11}+xg_{21})$. Where 11 refers to the path between the macro sector antenna of cell A to the UE, 21 refers to the path between the pico sector antenna of cell A to the HE, and 31 refers to the path between the macro sector antenna of cell B to the UE. For two cells of similar configuration, when the HE is near the border between the two cells, the DL geometry should be near one.

Similarly the UL geometry is the ratio of the received power from the UE at each cell, which is related to the power transmitted from the UE. As shown in FIG. 3, the UL geometry=$P_{RX,A}/P_{RX,B}=P_{TX}g_{31}/(P_{TX}g_{11}+xP_{TX}g_{21})=g_{31}/(g_{11}+xg_{21})$.

As seen in FIG. 3, if the downlink geometry is set equal to 1, then the actual uplink geometry is lower than 1. This indicates a potential handover problem in the uplink if a UE is moving from cell B to cell A because of the poor connection with the target eNodeB in the uplink. This can be shown as DL geometry=$1=g_{31}/(g_{11}+xg_{21})$, as stated above so $g_{31}=(g_{11}+xg_{21})$. Substituting for $g_{31}$, the UL geometry=$(g_{11}+xg_{21})/(g_{11}xg_{21})=1+(x-1)/(g_{11}+g_{21})$. If $x<1$, then the UL geometry<1.

The downlink geometry is also used as an indication of possible uplink inter-cell interference that a UE might generate relative to the useful signal strength in the serving eNodeB. The example just described with the uplink geometry lower than 1 indicates that the signal strength received in the neighboring eNodeB is smaller than the signal strength received in the serving eNodeB. The traditional geometry measurement based on downlink CRS using RSRP/RSRQ has overestimated the inter-cell interference to cell A.

Figure 4:
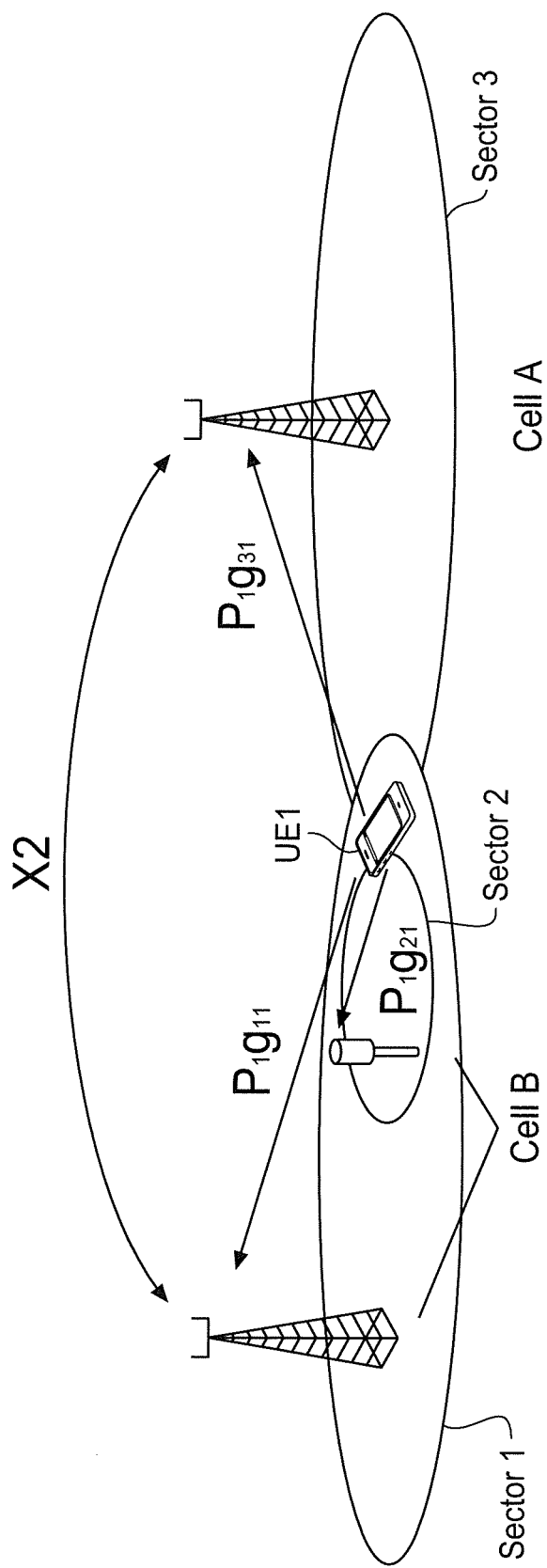
FIG. 4 is a diagram of computing uplink and downlink geometry in a cell according to another embodiment of the invention.

FIG. 4 shows support for the forwarding of SRS configurations and SRS measurement results over an X2 interface between sector 1 and sector 3 with an example. The configurations of the cells are the same as in FIG. 3. UE1 has a serving cell B that consists of one macro sector and one pico sector. Cell A is the neighboring cell, which has only one macro sector. The paths 11, 21, 31 are the same as in FIG. 3 and an X2 path is shown connecting the eNodeBs of the two cells. A procedure for forwarding information can be related to the configuration of FIG. 4.

The geometry measurements described above may be used for handover as described in more detail below and also in the ICIC. In ICIC, the measurements are used to identify the users that might cause high inter-cell interference to the users in a neighboring cell. For example, the UL geometry=$P_{RX,A}/P_{RX,B}$, where $P_{RX,A}$ is the received power in the neighboring cell and $P_{RX,B}$ is the received power in the serving cell of the respective UE. The $P_{RX,A}$ indicates the interference that the UE caused to the UEs in the neighboring cell, and $P_{RX,B}$ indicates the useful signal strength and the useful data that the UE contributes. The higher the UL geometry, the higher the inter-cell interference that the UE might cause as compared to the useful signal. By comparing the UL geometry with a certain threshold, a high interference UE can be identified. This is typically a UE at the cell edge that is causing high interference to the neighboring cell.

There are a variety of different possible remedies to the detected high ICI. One remedy that can be applied by ICIC is to schedule the users at the cell edge to different cells in different part of the spectrum to avoid interference.

Figure 5:
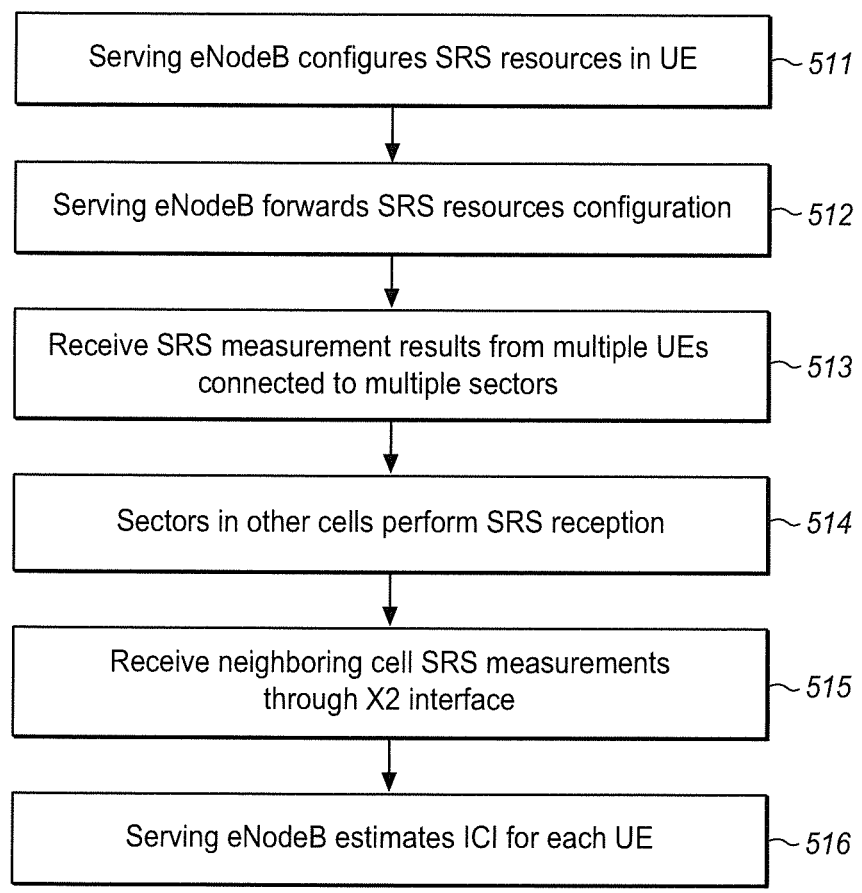
FIG. 5 is a process flow diagram of estimating inter-cell interference according to an embodiment of the invention.

FIG. 5 is a process flow diagram that shows a process for determining whether there is a high ICI UE and then applying a remedy. At block 511, the initial configuration may be performed for making measurements. At 511, the serving eNodeB configures SRS resources in the UE. This operation is used to support SRS measurements taken by eNodeBs. However, uplink measurement may be made in other ways, in which case this operation may not be required.

At 512, the serving eNodeB forwards the SRS resource configuration for UE1 to the eNodeB in a neighboring cell A. This can be combined with the SRS resource configurations of multiple UEs. The SRS resource configuration may be useful for handover decisions as well as for the inter-cell interference estimations described herein.

At 513, the eNodeB can receive SRS measurements results concerning one or many different UEs connected to any of the sectors served by the serving eNodeB. In the examples above, the cells include pico sectors and macro sectors.

At 514, sectors in other cells perform SRS reception. These other sectors may measure the channel quality and filter the measured channel quality using any of the approaches described above. A variety of different measures may be used, or, as mentioned above, a measure other than SRS reception may be used.

At 515, the serving eNodeB receives the SRS reception measurement results from its neighboring cells. This information may be sent through the X2 interface that connects them together or through some other means. For example, a backplane interface or other interface between different controllers may be used. In one example, eNodeBs in all of the neighboring cells provide this information to each of their neighbors. This allows each eNodeB to autonomously perform its necessary processes.

At 516, the serving eNodeB uses the received measurements from each of the different cells and UEs to estimate ICI for each UE. The measure may be based entirely on the uplink or SRS reception. A measurement of the downlink signal from the first and second cells may be used as an additional value in the ICE estimation or to make as a separate ICI estimation. There are a variety of different ways of estimating ICI. In one example, the UL geometry based on the SRS reception is used.

After ICI estimates are made, individual UEs may be selected for some measure to reduce the interference. This may include forcing a handover, changing channel assignments or some other measure.

Figure 2:
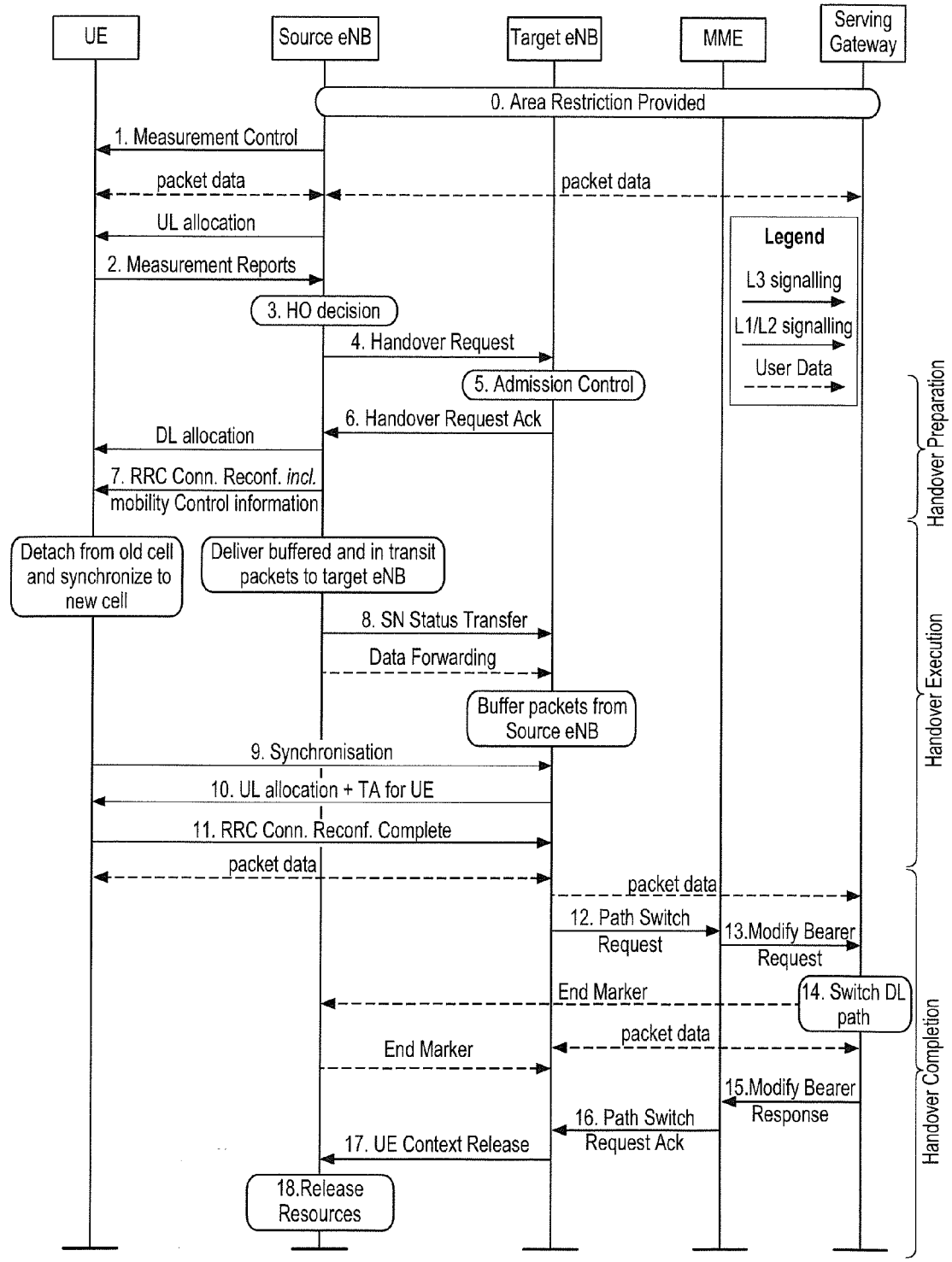
FIG. 2 is a communications flow diagram illustrating handover of a user equipment from a source eNodeB to a target eNodeB.
Figure 6A:
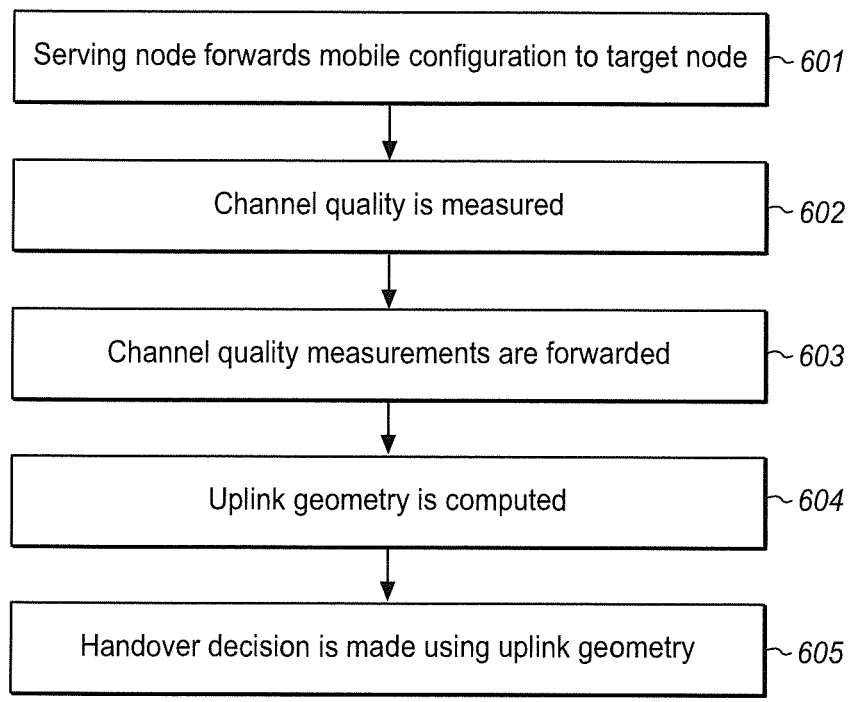
FIG. 6A is a process flow diagram of making a handover decision according to one embodiment of the invention.

FIG. 6A shows a process flow diagram of using communications between cells for handover decisions. The process may be performed using the hardware configuration of any of FIGS. 3, 4, and 7 or another configuration. In the context of FIG. 2, the process is a part of operations 2. Measurement Reports and 3. Handover Decision. While reference will be made using naming conventions, components, and protocols of LTE and e-UTRAN, the invention is not so limited and may be applied to handover decisions in other types of cellular radio communications systems.

Step (1): At 601, serving eNodeB in cell B forwards the SRS resource configuration for UE1 to the eNodeB in neighboring cell A. The SRS resource may be semi-persistently allocated to the UE through RRC signaling. This can be done after the serving eNodeB has configured SRS resources in the UE. The eNodeB may also provide the SRS resource configurations of multiple UEs to the neighbor eNodeB(s) if the SRS measurement results from multiple UEs connected to sectors are considered needed for inter-cell interference estimation.

Step (2): At 602, all sectors in both cells perform SRS reception and measure the channel quality. One example of the channel quality measurement is the received wideband SRS power, $P^{rx}_s$, for UE1: $P^{rx}_s = P^{gs}_s$, where s is the sector number and gs is the path gain from the UE to the antenna for sector s.

Step (3): At 603, the eNodeB in neighboring cell A forwards the measurement result, filtered $P^{rx}_3$ to the serving cell eNodeB through the X2 interface. More than one neighboring eNodeB may provide the SRS measurement results to the serving eNodeB. This freedom enables parallel processes in different eNodeBs which might reduce the overall signaling delay.

Step (4): At 604, serving cell eNodeB and the relevant neighbor eNodeBs start computing the uplink geometry based on the received signal strength of the sectors in the neighboring cells (filtered $P^{rx}_3$) and the measured signal strength of the sectors in the own cells (filtered $P^{rx}_1$, filtered $P^{rx}_2$):

$$\text{Uplink Geometry} = \Sigma \text{filtered} P^{rx}_{s,neighbor} / \sum \text{filtered} P^{rx}_{s,serving}$$
$$= \text{filtered} P^{rx}_3 / (\text{filtered} P^{rx}_1 + \text{filtered} P^{rx}_2)$$

Step (5): At 605, serving cell eNodeB compares the Uplink Geometry with a predefined threshold (TH) and makes a handover decision based on both Uplink geometry and/or Downlink geometry. This can be done using an SRS measurement The wideband SRS filtered received power per sector and the correspondent sector ID (Identification) may be exchanged between eNodeBs over the X2 interface. The filtering is applied in the sending eNodeB that provides the SRS measurement results to reduce the signaling intensity and to meet the signaling delay. One example of the filtering is $$\text{fitered} P^{rx}_s = (1-\beta)\text{fitered} P^{rx}_s + \beta P^{rx}_s$$

where β is a forgetting factor. $P^{rx}_s$ is the received SRS power for UE1 in sector s before filtering. Filtered $P^{rx}_s$ is the received power of UE1 after filtering. Note that β can be determined based on the X2 interface delay.

Embodiments may for example comprise a method in a controller for a first cell in a mobile network for making a handover decision comprising the steps of obtaining first and second measurement of uplink signals from a user equipment received at first and second cells, and making a handover decision using the measurements. Downlink signal measurement data may also be used for one or more of the first and second cells.

Similar to the handover decision, an inter-cell interference estimate can also be made from such signal estimates as described above. The measurements may be SRS measurements. Measurement results, as well as SRS configurations may be communicated over the X2 interface.

Embodiments may for example alternatively comprise a method in a controller for a first cell in a mobile network for making a handover decision comprising the steps of receiving from a mobile station the result of a measurement of a downlink signal to the mobile station from a first cell controlled by the controller from a mobile station, receiving from the mobile station the result of a measurement of a downlink signal to the mobile from a second cell, receiving the result of a measurement of an uplink signal from the mobile to the first cell, receiving the result of a measurement of an uplink signal from the mobile to the second cell, and making a handover decision in dependence of downlink data for the first and second cell and further in dependence of uplink data for one or more of the first and second cells that are multisector cells. Similar to the handover decision, an inter-cell interference estimate can also be made from such signal estimates.

Figure 6B:
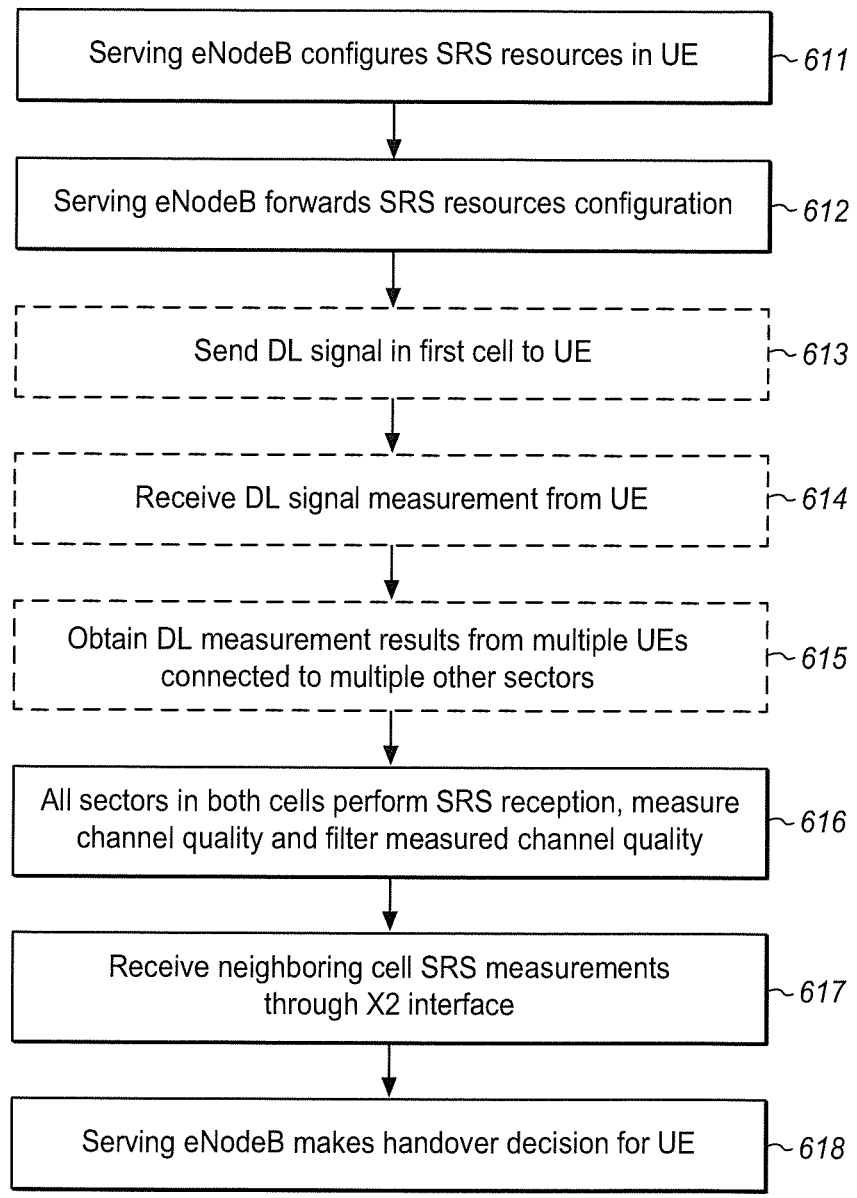
FIG. 6B is a process flow diagram of making a handover decision according to another embodiment of the invention.

FIG. 6B shows a process flow diagram of using communications between cells for handover decisions. Starting at block 611 the initial configuration may be performed for making measurements. At 611, the serving eNodeB in a cell A configures SRS resources in the UE. Alternatively, the UE may already be configured or may have been configured by a different eNodeB at another time. The SRS resource may be semi-persistently allocated to the UE through RRC signaling, for example. Alternatively, other types of signaling may be used.

At 612, the serving eNodeB forwards the SRS resource configuration for UE1 to the eNodeB in a neighboring cell A. This can be combined with the SRS resource configurations of multiple UEs. The SRS resource configuration may be useful for other handover decisions and also for inter-cell interference estimations.

At 613, the serving eNodeB optionally sends a DL signal to the UE that has been configured for SRS. The UE measures this signal using RSRP, RSRQ or any other desired approach and then at 614 it optionally sends the measurement result to the serving eNodeB which receives and stores it. The eNodeB in neighboring cell A optionally sends a DL signal to the UE that has been configured for SRS. The UE measures this signal using RSRP, RSRQ or any other desired approach and then at 614 it optionally sends the measurement result to the serving eNodeB which receives and stores it At 615, the eNodeB can optionally receive measurements from many different UEs connected to any of the other sectors served by the serving eNodeB and any other sectors in other cells. These measurements may be RSRP, RSRQ or any other type of measurements as mentioned above. In the examples above, the cells include pico sectors and macro sectors, however, there may be other and more types of sectors than those shown depending upon the network configuration. This operation is an optional operation that may improve the handover decisions, especially a downlink handover decision.

At 616, all eNodeBs in all of the sectors in both cells perform SRS reception on uplink signals from the UE. The sectors in both cells then measure the channel quality and filter the measured channel quality using any of the approaches described above. One example of the channel quality measurement is the received wideband SRS power. However, other measures may used instead depending on the nature of the network. One such other measurement is a random access PRACH (Physical Layer Random Access Channel) preamble measurement.

When using PRACH, instead of sending SRS configuration in the X2 interface, the UE identifier for uplink measurement may be sent by the controller for the serving node to the target cell controller. The node at the serving cell can command the UE to perform a random access. For the random access, the UE transmits a PRACH preamble with its UE identifier. Both the eNodeB at the serving cell and the eNodeB at neighboring cells including the target eNodeB can receive the PRACH preamble and perform uplink measurements. Similar to SRS, the measurement result is filtered. The filtered measurement results may then be sent through an X2 interface, a backplane interface, or another interface in the same way as described above for SRS. The uplink channel measurement results may be used to estimate ICI and also for handover decisions.

Another example of an uplink signal is PUSCH (Physical Uplink Shared Channel) data reception. Instead of an SRS configuration which provides a UE identifier for uplink measurement, a PUSCH resource allocation for the UE can be sent through an X2, backplane, or other interface. Both the eNodeB of the serving cell and the eNodeB of the target and neighboring cells can perform uplink measurement for the UE at the allocated PUSCH resource. Similar to SRS, the measurement result is filtered. The filtered measurement results may also be sent through the X2 or backplane interface in a manner similar to that described above for SRS and for PRACH. While three examples of measurable uplink signals are provided, the invention is not so limited and many other signals may be used depending on the particular implementation and the signals that are allowed by the available standards and protocols.

At 617, the serving eNodeB receives the measurement results from its neighboring cells. This information in the form of a filtered $P^{rx}_3$ can easily be sent to the serving cell eNodeB through the X2 interface that connects them together. In one example, all of the neighboring cells provide this information to each of their neighbors. This allows each cell to autonomously perform its necessary processes. Traffic on the X2 interface can be reduced by only providing this information on demand, when a handover is contemplated, or based on some other triggering event.

At 618, the serving eNodeB makes a handover decision for handover of a UE from the first cell to the second cell based on the measurement of the uplink signals measured in the first and second cells. The measurement of the downlink signals received from the UE may also be used. There are a variety of different ways of making a handover decision.

In one example, the serving cell eNodeB and the relevant neighbor eNodeBs or controllers for these nodes start computing the uplink geometry. They then compare the uplink geometry and optionally the downlink geometry with one or more thresholds. If the thresholds are exceeded then the handover is made to the appropriate one of the neighboring cells using handover requests to the target cell and related signaling. In an example, handover decisions for downlink and uplink may be taken separately and independently, so that, after a handover, the downlink may be handled by one cell and the uplink by another. The downlink handover decision may be based on downlink geometry estimated from downlink measurements and the uplink handover decision based separately and independently on uplink geometry estimated from uplink measurements.

The operations of the flow and signaling diagrams are described with reference to exemplary embodiments. However, it should be understood that the operations of the flow diagrams can be performed by variations other than those discussed with reference to these other diagrams, and the variations discussed with reference to these other diagrams can perform operations different than those discussed with reference to the flow diagrams.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., a UE, an eNodeB, etc.). Such electronic devices store and communicate (internally and/or with other electronic devices over a network) code and data using machine-readable media, such as non-transitory machine-readable storage media (e.g., magnetic disks; optical disks; random access memory; read only memory; flash memory devices; phase-change memory) and transitory machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

Figure 7:
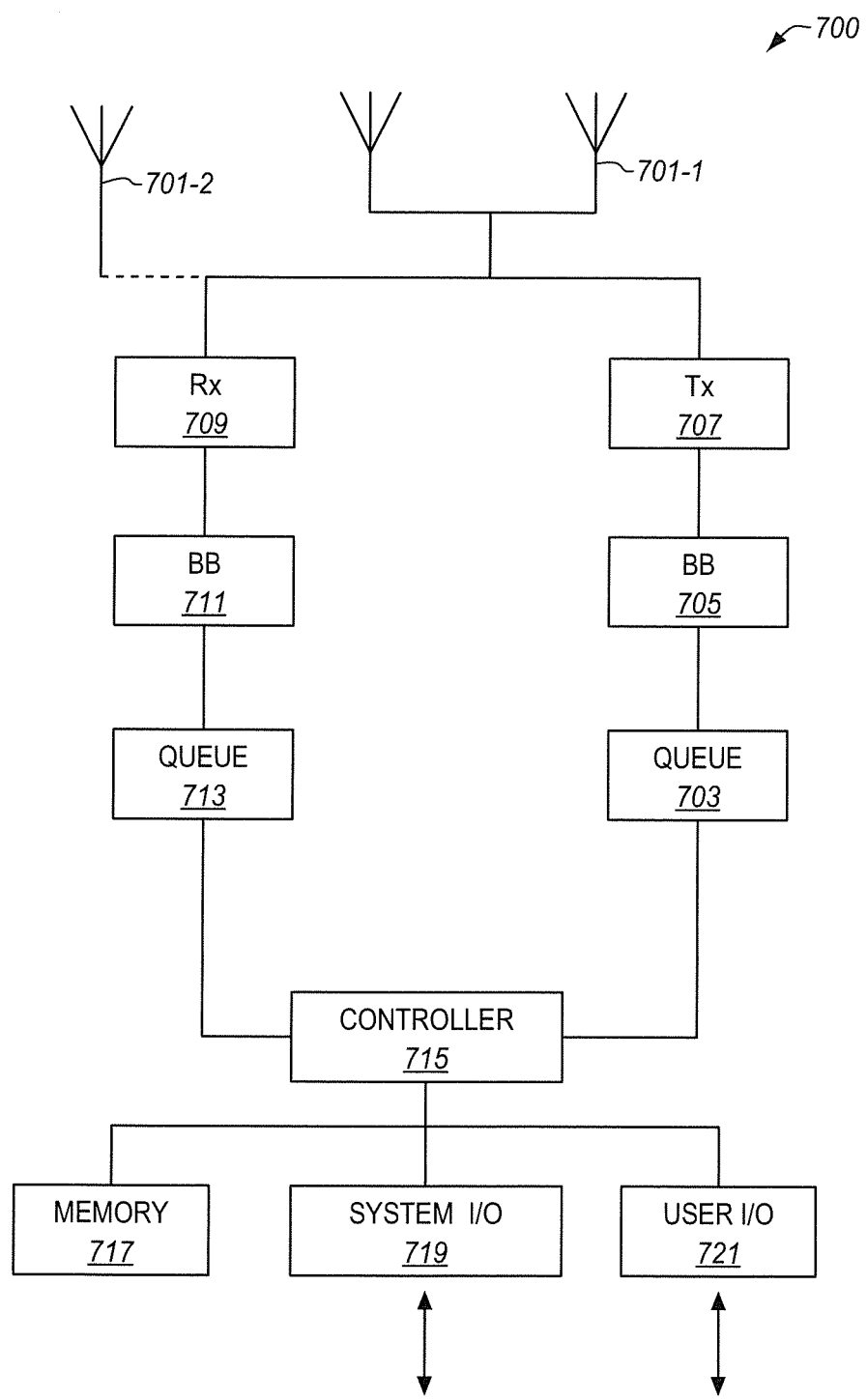
FIG. 7 is a block diagram of a fixed or mobile station according to an embodiment of the invention.

FIG. 7 is an example hardware diagram of a device architecture suitable for the UE and for an eNodeB. The hardware 700 includes one or more antenna elements 701. There may be separate transmit and receive arrays, sectorized or diversity antennas or a single omnidirectional antenna element. For transmission, data is collected in a transmit queue 703 from which it is transferred to a baseband modulator 705 for conversion to symbols, modulation and upconversion. A transmitter 707 further modulates and amplifies the signal for transmission through the antenna.

On the receive side, received symbols are demodulated and downconverted to baseband in a receive chain 709. The baseband system extracts a bit sequence from the received signal and generates any error detection codes that may be needed. The bit stream is stored in a receive buffer or queue 713 for use by the system.

A controller 715 controls the operation of the receive and transmit chains, applies data to the outbound queue and receives data from the inbound queue. It also generates messages to support the wireless and wired protocols over which it communicates. The controller is coupled to one or more memory systems 717 which may contain software, intermediate cached values, configuration parameters, user and system data. The controller may also include internal memory in which any one or more of these types of information and data may be stored instead of or in addition to being stored in the external memory system. The controller is coupled to a system input/output interface 719 which allows for communication with external devices and a user input/output interface 721 to allow for user control, consumption, administration and operation of the system.

In the case of an eNodeB, the system interface 719 may provide access over the S1, OSS and X2 interfaces to the rest of the network equipment to send and receive data, messages, and administrative data. However, one or more of these interfaces may also use the radio interface 701 or another interface (not shown). In the case of a UE, the system interface may connect to other components on the device, such as sensors, microphones, and cameras, as well as to other devices, such as personal computers or other types of wireless networks, through wireless or wired interfaces.

Figure 8:
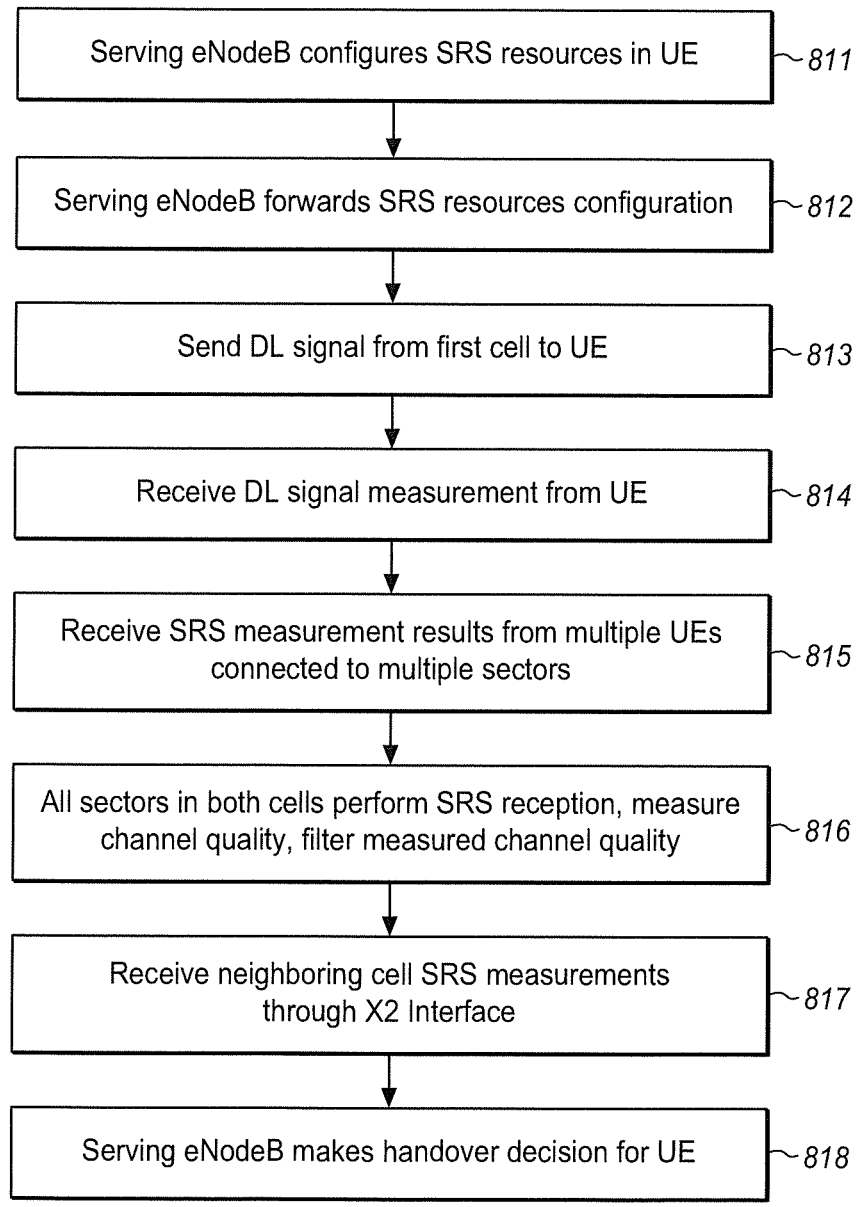
FIG. 8 is an alternative process flow diagram of making a handover decision according to another embodiment of the invention.

FIG. 8 shows an alternative process flow diagram of using communications between cells for handover decisions. Starting at block 811 the initial configuration may be performed for making measurements. At 811, the serving eNodeB configures SRS resources in the UE. Alternatively, the UE may already be configured or may have been configured by a different eNodeB at another time. The SRS resource may be semi-persistently allocated to the UE through RRC signaling, for example. Alternatively, other types of signaling may be used.

At 812, the serving eNodeB forwards the SRS resource configuration for UE1 to the eNodeB in a neighboring cell A. This can be combined with the SRS resource configurations of multiple UEs. The SRS resource configuration may be useful for other handover decisions and also for inter-cell interference estimations.

At 813, the serving eNodeB sends a DL signal to the UE that has been configured for SRS. The UE measures this signal using RSRP, RSRQ or any other desired approach and then at 814 it sends the measurement result to the serving eNodeB which receives and stores it.

At 815, the eNodeB can receive measurements from many different UEs connected to any of the sectors served by the serving eNodeB. These measurements may be in the form of SRS measurements as mentioned above. In the examples above, the cells include pico sectors and macro sectors, however, there may be other and more types of sectors than those shown depending upon the network configuration. This operation is an optional operation that may improve the handover decisions.

To support the optional operations at 815, at 816, all sectors in both cells perform SRS reception. The sectors in both cells then measure the channel quality and filter the measured channel quality using any of the approaches described above. One example of the channel quality measurement is the received wideband SRS power. However, other measures may used instead depending on the nature of the network.

At 817, the serving eNodeB receives the measurement results from its neighboring cells. This information in the form of a filtered $P^{rx}_3$ can easily be sent to the serving cell eNodeB through the X2 interface that connects them together. In one example, all of the neighboring cells provide this information to each of their neighbors. This allows each cell to autonomously perform it necessary processes. Traffic on the X2 interface can be reduced by only providing this information on demand when a handover is contemplated or based on some other triggering event.

At 818, the serving eNodeB makes a handover decision for handover of UE from the first cell to the second cell based on the measurement of the downlink signal from the first and second cells. The measurement of the uplink signals from the UE to the first and second cells may also be used. There are a variety of different ways of making a handover decision. In one example, the serving cell eNodeB and the relevant neighbor eNodeBs start computing the uplink geometry baseband processing. They then compare the uplink geometry and optionally the downlink geometry with one or more thresholds. If the thresholds are exceeded then the handover is made to the appropriate one of the neighboring cells using handover requests to the target cell and related signaling.

The operations of FIG. 8 can be described as a method. The method is in a controller for a first cell in a mobile cellular network for making a handover decision to a second cell of the mobile cellular network. The method comprises sending a downlink signal from the first cell to a mobile station, receiving from the mobile station the result of a measurement of the downlink signal to the mobile station from the first cell, sending an indication of the received measurement from the first cell to the second cell, and making a handover decision for handover of the mobile station from the first cell to the second cell based on the measurement of the downlink signal from the first and second cells.

Any one or more of the above methods may include, wherein the second cell sends a downlink signal to the mobile station, and receives a result of a measurement of the downlink signal, the method further comprising receiving an indication of the received measurement of the second cell downlink signal from the second cell and wherein making a handover decision comprises making a handover decision using the received indication.

Any one or more of the above methods may further comprise measuring an uplink signal from the mobile to the first cell, receiving an indication of a measurement of an uplink signal from the mobile to the second cell, and wherein making a handover decision comprises making a handover decision using the uplink signal measurements.

In any one or more of the above methods the first and second cells may be multisector cells. Any one or more of the above methods may further comprise making an intercell interference estimate based on the measurement of the downlink signal from the first and second cells and the measurement of the uplink signal to the first and second cells.

In any one or more of the above methods, the measurements received at the first cell may be communicated to the second cell over an X2 interface connecting the first and second cell. The measurements of the downlink signals from the first and second cells may be sounding reference signal measurements.

Any one or more of the above methods may further comprise communicating sounding reference signal configurations to the second cell over an X2 interface connecting the first and second cell. Any one or more of the above methods may further comprise allocating the mobile station with sounding reference signal resources using Radio Resource Control signaling. Any one or more of the above methods further comprise communicating sounding reference signal configuration to the second cell for a plurality of mobile stations over the X2 interface.

In any one or more of the above methods, making a handover decision may comprise computing uplink geometry based on the received measurements and comparing the computed uplink geometry with a predefined threshold.

The operations above may also be performed by an apparatus having a processor, a transmitter, a receiver and a memory for performing any one or more of the above methods. Alternatively, the operations may be performed using a machine-readable medium having instructions stored thereon that when operated on by the machine cause the machine to perform any one or more of the above methods.

The operations of the flow diagrams are described with reference to the exemplary embodiments of the other diagrams. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams.

While the flow diagrams in the figures show a particular order of operations performed by certain embodiments of the invention, it should be understood that such order is exemplary (e.g., alternative embodiments may perform the operations in a different order, While the invention has been described in terms of several embodiments, those skilled in the art will recognize that the invention is not limited to the embodiments described, can be practiced with modification and alteration. The description is thus to be regarded as illustrative instead of limiting.

What is claimed is:

1. A method in a controller of a first cell in a mobile cellular network for making a decision to handover a user equipment to a target cell of the mobile cellular network, the method comprising:
    performing, at a first sector of the multi-sector cell, a first measurement of an uplink signal received from a user equipment;
    obtaining a second measurement of an uplink signal received from the user equipment, wherein the second measurement is performed by the target cell;
    obtaining a third measurement of an uplink signal received from the user equipment, wherein the third measurement is performed by a second sector of the multi-sector source cell; and
    making a decision to handover the user equipment from the first cell to the target cell using the first, second, and third measurements including computing an uplink geometry based on the obtained first, second, and third measurements, wherein the uplink geometry is a ratio of second measurement to a sum of the first and third measurements performed by the first and second sector, respectively, of the multi-sector source cell, and comparing the computed uplink geometry with a predetermined threshold.

2. The method of claim 1, further comprising sending to a controller of the target cell a measurement configuration for measuring the uplink signal received at the target cell before obtaining the second measurement.

3. The method of claim 1, wherein obtaining a first measurement comprises:
    receiving an uplink signal at the controller of the first cell from the user equipment; and
    measuring the uplink signal at the controller of the first cell.

4. The method of claim 1, wherein the second measurement is made by a controller of the second cell and wherein obtaining a second measurement comprises receiving an indication of the second measurement from the controller of target cell.

5. The method of claim 4, wherein the second measurement is received at the controller for the first cell over an X2 interface connecting the controller of the first cell and the controller of the target cell.

6. The method of claim 4, wherein the first and second measurements are sounding reference signal measurements, the method further comprising allocating the user equipment with sounding reference signal resources using Radio Resource Control signaling.

7. The method of claim 6, further comprising communicating the sounding reference signal configuration of the user equipment to the controller of the target cell over an X2 interface connecting the controllers of the first and second cells before receiving the indication of the second measurement.

8. The method of claim 1, further comprising:
    sending a downlink signal from a transmitter of the multi-sector source cell to the user equipment;
    receiving from the user equipment an indication of a measurement of the downlink signal from the transmitter of the first cell and an indication of a measurement of a downlink signal transmitted from a transmitter of the target cell; and wherein making a decision comprises making a handover decision using the downlink signal measurements.

9. The method of claim 8, further comprising making an inter-cell interference estimate based on the measurement of the uplink signal to the multi-sector source cell and the target cell.

10. The method of claim 8, wherein making a decision comprises making an uplink handover decision based on the uplink measurements and making a separate downlink handover decision based on the downlink measurements.

11. A non-transitory computer-readable storage medium having computer code stored therein that when executed by a processor of a controller of a multi-sector source cell in a mobile cellular network for making a decision to handover a user equipment to a target of the mobile cellular network, cause the controller to perform operations comprising:
 performing, at a first sector of the multi-sector source cell, a first measurement of an uplink signal received from a user equipment;
 obtaining a second measurement of an uplink signal received from the user equipment wherein the second measurement is performed by the target cell;
 obtaining a third measurement of an uplink signal received from the user equipment, wherein the third measurement is performed by a second sector of the multi-sector source cell; and
 making a decision to handover the user equipment from the multi-sector source cell to the target cell using the first, second, and third measurements including computing an uplink geometry based on the obtained first, second and third measurements, wherein the uplink geometry is a ratio of second measurement to a sum of the first and third measurements performed by the first and second, respectively, of the multi-sector source cell, and comparing the computed uplink geometry with a predetermined threshold.

12. The non-transitory computer-readable storage medium of claim 11, the operations further comprising:
 allocating the user equipment with sounding reference signal resources using Radio Resource Control signaling, wherein the first and second measurements are sounding reference signal measurements, and
 communicating the sounding reference signal configuration of the user equipment to target cell before receiving the indication of the second measurement.

13. The non-transitory computer-readable storage medium of claim 11 wherein the first measurement is of a first uplink signal and the second measurement is of a second uplink signal.

14. An apparatus comprising:
 a receiver to receive an uplink signal from a user equipment at a first sector of a multi-sector source cell of a mobile cellular network;
 an interface to receive from a second cell in the mobile cellular network an indication of a second measurement of an uplink signal received from the user equipment at the target cell;
 the interface to receive from another apparatus at a second sector of the multi-sector source cell an indication of a third measurement of an uplink signal received from the user equipment; and
 a processor to perform a first measurement of the uplink signal received at the first sector of the multi-sector source cell, and to make a decision to handover the user equipment from the multi-sector source cell to the target cell using the first, second, and third measurements including computing an uplink geometry based on the first, second, and third measurements, wherein the uplink geometry is a ratio of second measurement to a sum of the first and third measurements performed by the first and second sector, respectively, of the multi-sector source cell, and comparing the computed uplink geometry with a predetermined threshold.

15. The apparatus of claim 14, further comprising a transmitter and wherein the processor is further to allocate the user equipment with sounding reference signal resources using Radio Resource Control signaling through the transmitter.

16. The apparatus of claim 15, wherein the interface is an X2 interface and wherein the interface is further to send sounding reference signal configuration of the user equipment to the target cell.

17. The apparatus of claim 14, wherein the processor is further to make an intercell interference estimate based on the measurement of the uplink signal from the multi-sector source cell and the target cell.

18. A method in a serving Evolved Node B (eNB) of a first sector of a multi-sector source cell of a Long Term Evolution packet data communications network comprising:
 configuring sounding resource signal (SRS) resources in a User Equipment (UE);
 sending the SRS configuration to a target eNB of a target cell;
 performing SRS reception with the UE to measure uplink channel quality;
 receiving SRS measurements made by the target eNB with respect to the UE at an X2 interface from the target eNB;
 receiving SRS measurements made by an eNB of a second sector of the multi-sector source cell with respect to the UE;
 computing uplink geometry using a performed SRS measurement made by the eNB of the first sector of the multi sector source cell and SRS measurements made by the target eNB and the eNB of the second sector of the multi sector source cell, wherein the uplink geometry is a ration of the SRS measurements made by the target eNB to the sum of the performed SRS measurement made by the eNB of the first sector of the multi-sector source cell and the SRS measurements made by the eNB of the second sector of the multi-sector source cell; and
 comparing the computed uplink geometry with a predetermined threshold to determine whether the UE should be handed over to the target eNB.

19. The method of claim 18, further comprising:
 receiving downlink signal measurements at a receiver of the serving eNB from the UE;
 computing downlink geometry using the received downlink signal measurements; and
 combining the computed downlink geometry with the computed uplink geometry in determining whether the UE should be handed over to the target eNB.

* * * * *